US008154465B2

(12) United States Patent
Gunston et al.

(10) Patent No.: US 8,154,465 B2
(45) Date of Patent: Apr. 10, 2012

(54) PORTAL ANTENNA

(75) Inventors: Patrick Bernard Gunston, Mt. Gravatt East (AU); Kevin Paul Ford, Holland Park (AU); Christopher John McLoughin, Mt. Gravatt East (AU); Paul Anthony Turnbull, Springfield (AU); David Low Scott, Roxburghshire (GB)

(73) Assignee: Allflex Australia Pty. Limited, Queensland (AU)

( * ) Notice: Subject to any disclaimer, the term of this patent is extended or adjusted under 35 U.S.C. 154(b) by 241 days.

(21) Appl. No.: 11/992,366

(22) PCT Filed: Sep. 19, 2006

(86) PCT No.: PCT/AU2006/001367
§ 371 (c)(1),
(2), (4) Date: Apr. 17, 2009

(87) PCT Pub. No.: WO2007/033407
PCT Pub. Date: Mar. 29, 2007

(65) Prior Publication Data
US 2009/0213023 A1 Aug. 27, 2009

(30) Foreign Application Priority Data
Sep. 20, 2005 (AU) ............................... 2005905176

(51) Int. Cl.
*H01Q 7/08* (2006.01)
*H01Q 21/00* (2006.01)
(52) U.S. Cl. ......... 343/788; 343/718; 343/866; 343/867
(58) Field of Classification Search .................. None
See application file for complete search history.

(56) References Cited

U.S. PATENT DOCUMENTS

| 1,959,709 | A | | 5/1934 | Deeds |
|---|---|---|---|---|
| 2,172,868 | A | | 9/1939 | Elson |
| 2,455,772 | A | | 12/1948 | Jackle |
| 3,083,561 | A | | 4/1963 | Sussina |
| 3,500,373 | A | | 3/1970 | Minasy |
| 3,562,854 | A | | 2/1971 | Schmidt, Jr. |
| 3,790,945 | A | | 2/1974 | Fearon |
| 4,095,214 | A | | 6/1978 | Minasy |
| 4,274,083 | A | | 6/1981 | Tomoeda |
| 4,798,175 | A | | 1/1989 | Townsend et al. |
| 5,859,586 | A | | 1/1999 | Sasagawa et al. |
| 6,094,173 | A | * | 7/2000 | Nylander ....................... 343/742 |
| 2002/0044096 | A1 | * | 4/2002 | Chung ........................... 343/742 |
| 2006/0132312 | A1 | * | 6/2006 | Tavormina .................. 340/572.7 |

(Continued)

FOREIGN PATENT DOCUMENTS
DE 1534841 9/1969
(Continued)

*Primary Examiner* — Trinh Dinh
(74) *Attorney, Agent, or Firm* — Kauth, Pomeroy, Peck & Bailey LLP

(57) ABSTRACT

A portal antenna (10) particularly suited for enabling low frequency RFID devices carried by animals to be read when animals are proceeding through a stock race or the like. The portal antenna includes a portal structure (11) through which an animal can pass and about which is wound at least one coil (18/19) of antenna conductor. At least one elongate radiator element (21) preferably projects to at least one side of the portal structure (11). Preferably the radiator(s) (21) is/are of ferrous/magnetically conductive metal. The radiator(s) can form a separate structure or be part of the wall structure of a stock race.

17 Claims, 6 Drawing Sheets

U.S. PATENT DOCUMENTS

2006/0170556 A1 * 8/2006 Fang .......................... 340/572.7

FOREIGN PATENT DOCUMENTS

| | | |
|---|---|---|
| DE | 2420688 | 11/1975 |
| DE | 3623816 | 1/1987 |
| EP | 0186483 | 7/1986 |
| EP | 0246881 | 11/1987 |
| EP | 0299557 | 1/1989 |
| EP | 0331269 | 9/1989 |
| EP | 0748586 | 12/1996 |
| FR | 1556846 | 2/1969 |
| FR | 2163343 | 7/1973 |
| GB | 464145 | 4/1937 |
| GB | 673991 | 6/1952 |
| GB | 896630 | 5/1962 |
| GB | 2076259 | 11/1981 |
| GB | 2164185 | 3/1986 |
| GB | 2190574 | 11/1987 |
| GB | 2326529 | 12/1998 |
| JP | 8162839 | 6/1996 |
| WO | WO-83/03203 | 9/1983 |
| WO | WO-84/01688 | 5/1984 |
| WO | WO-88/00007 | 1/1988 |
| WO | WO-89/05530 | 6/1989 |
| WO | WO-91/03930 | 4/1991 |
| WO | WO-98/08182 | 2/1998 |
| WO | WO-99/03084 | 6/1999 |
| WO | WO-01/03237 | 1/2001 |

* cited by examiner

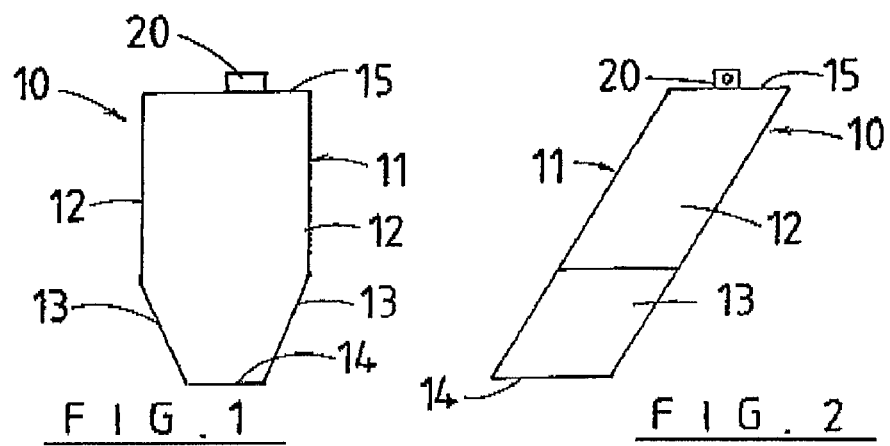
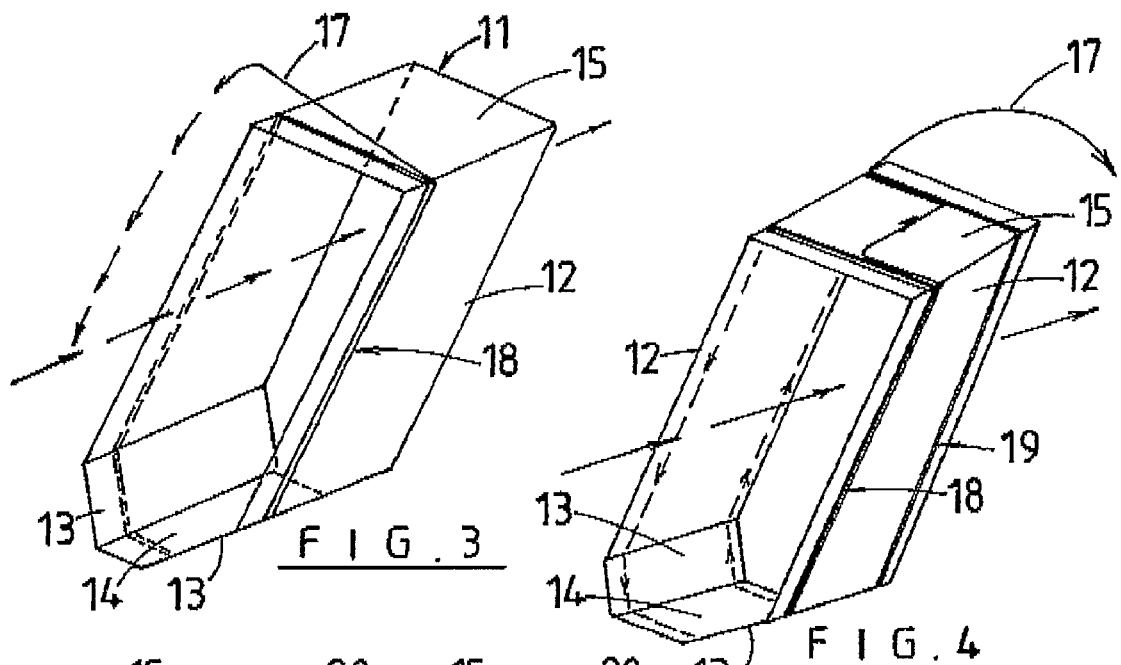
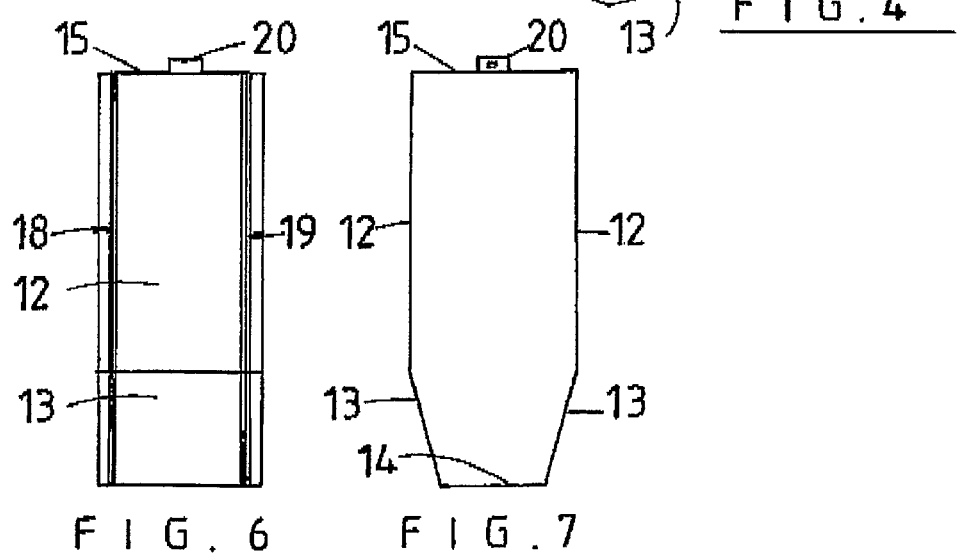

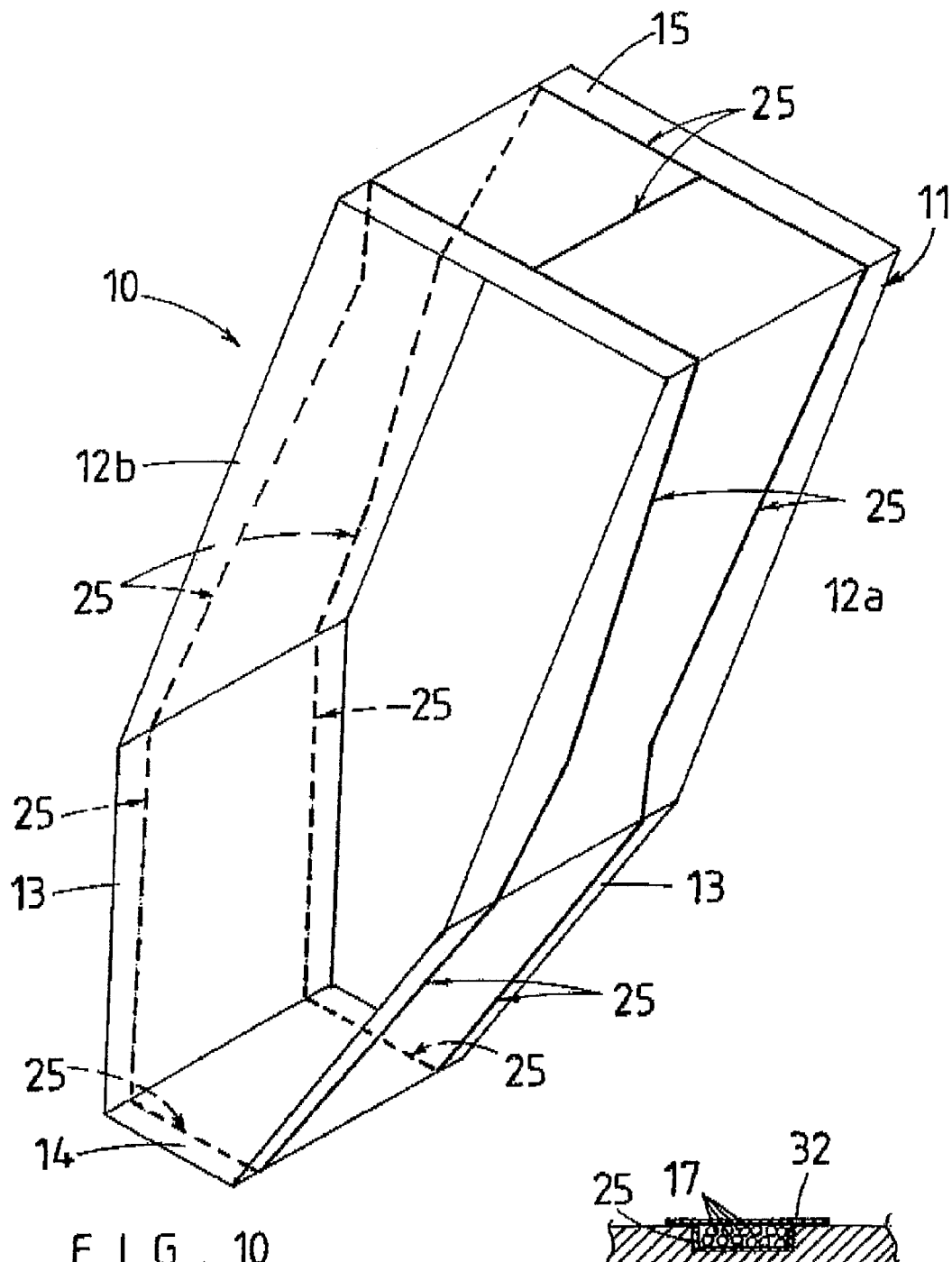
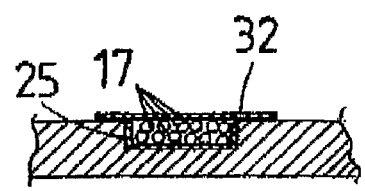
FIG. 10
FIG. 13

US 8,154,465 B2

PORTAL ANTENNA

RELATED APPLICATIONS

This is a non-provisional application claiming the benefit of International application number PCT/AU2006/001367 filed Sep. 19, 2006, which claims priority under 35 U.F.C. 119 to an application AUSTRALIA 2005905176 filed on Sep. 20, 2005

BACKGROUND TO THE INVENTION

This invention relates to an antenna and, more particularly, an antenna that can be used to enable low frequency RFID devices carried by animals to be read particularly when the animals are proceeding through a race or the like.

The use of low frequency RFID devices to provide a means of identification of animals is well known. The RFID device is interrogated (read) by a suitable reader that incorporates an antenna.

There are many situations in which such devices need to be read. One is in a stock race through which animals will move.

As with any identification system there is a need to maintain a high level of integrity so as to, for example, ensure that each tagged animal moving through a stock race will have its RFID device read. A problem that can arise in such situations is that the animal may move through too quickly for the RFID device to be read, or can move through the race in such a manner that the RFID device is not detected and read. This is especially so with small animals, such as sheep, where the animals can move rapidly through a race and, furthermore, can move in an unpredictable manner. The latter can result in a RFID device not being read due to the animal moving through a null zone in the antenna.

A solution to this problem is to ensure that animals moving through the race are held at some point in the race so that the RFID device can be read whereupon the animal is then allowed to move through the race. This, however, can be difficult for a variety of reasons but, in any event, does result in the procedure of moving the animals through the race and the reading of the RFID devices to be a more time consuming and tedious process than is desired.

SUMMARY OF THE INVENTION

There is, therefore, a need for an antenna that can be placed in the stock race to effectively and efficiently read low frequency RFID devices carried by animals as the animals move through the race. An object of the present invention is to provide such an antenna or, at least, provide the public with a useful choice.

Broadly according to one aspect of the present invention there is provide a portal antenna including a portal structure defining an area through which an animal can pass and at least one coil of antenna conductor wound around the portal structure to extend around the area through which an animal can pass.

In a preferred form of the invention there is at least one elongate radiator element which projects either side of the portal structure and has a longitudinal axis that is at an angle of less than 90° to a plane transverse to the direction in which an animal passes through the portal structure.

In a preferred form the radiator(s) are of metal. They can form a separate structure or be part of the wall structure of a stock race.

According to one preferred form, the radiators are at substantially 30° to the coil(s).

In one form of the invention there are two coils, one located adjacent each edge of the portal structure, said coils being coupled together.

A connector unit carried by the portal structure is in one form connected to the coil(s).

According to a preferred form, the lower end of the portal structure has a floor from which projects at an incline a pair of opposed walls which connect to substantially vertically disposed walls of the portal structure.

BRIEF DESCRIPTION OF THE DRAWINGS

In the following more detailed description of the invention according to one preferred embodiment: —

FIG. 1 is a front elevation view of a portal antenna according to the present invention in one preferred embodiment, FIG. 2 is a side elevation view of the antenna as shown in FIG. 1, FIG. 3 is a perspective view of the antenna of FIGS. 1 and 2 showing the winding of a first coil of antenna wire on the portal structure, FIG. 4 is a view similar to FIG. 3 but showing completion of the winding of the antenna onto the portal structure to form a second coil, FIG. 6 is a side elevation view of a second embodiment of the invention illustrating the windings on the portal structure, FIG. 7 is a front elevation view of the antenna as shown in FIG. 6, FIG. 10 is a perspective view of the portal structure of a third embodiment showing the layout of grooves incorporated therein and in which wires or conductors are located to form the antenna, FIG. 13 is a detail view of a groove in which antenna conductor elements reside according to one embodiment of the invention.

DETAILED DESCRIPTION OF EMBODIMENTS OF THE INVENTION

Figure 11:
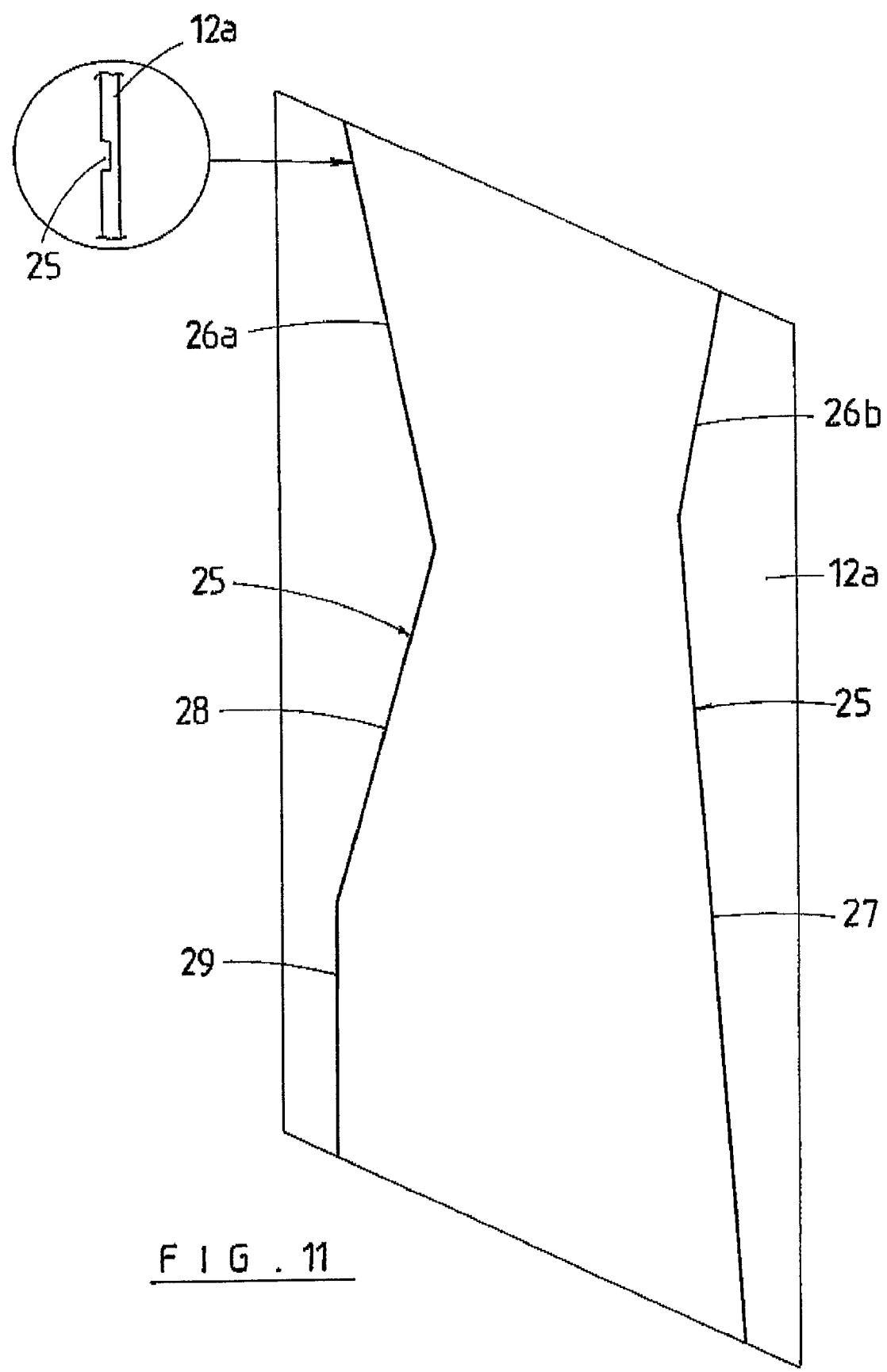
FIG. 11 is a face view of one sidewall of the portal structure of FIG. 10.
Figure 12:
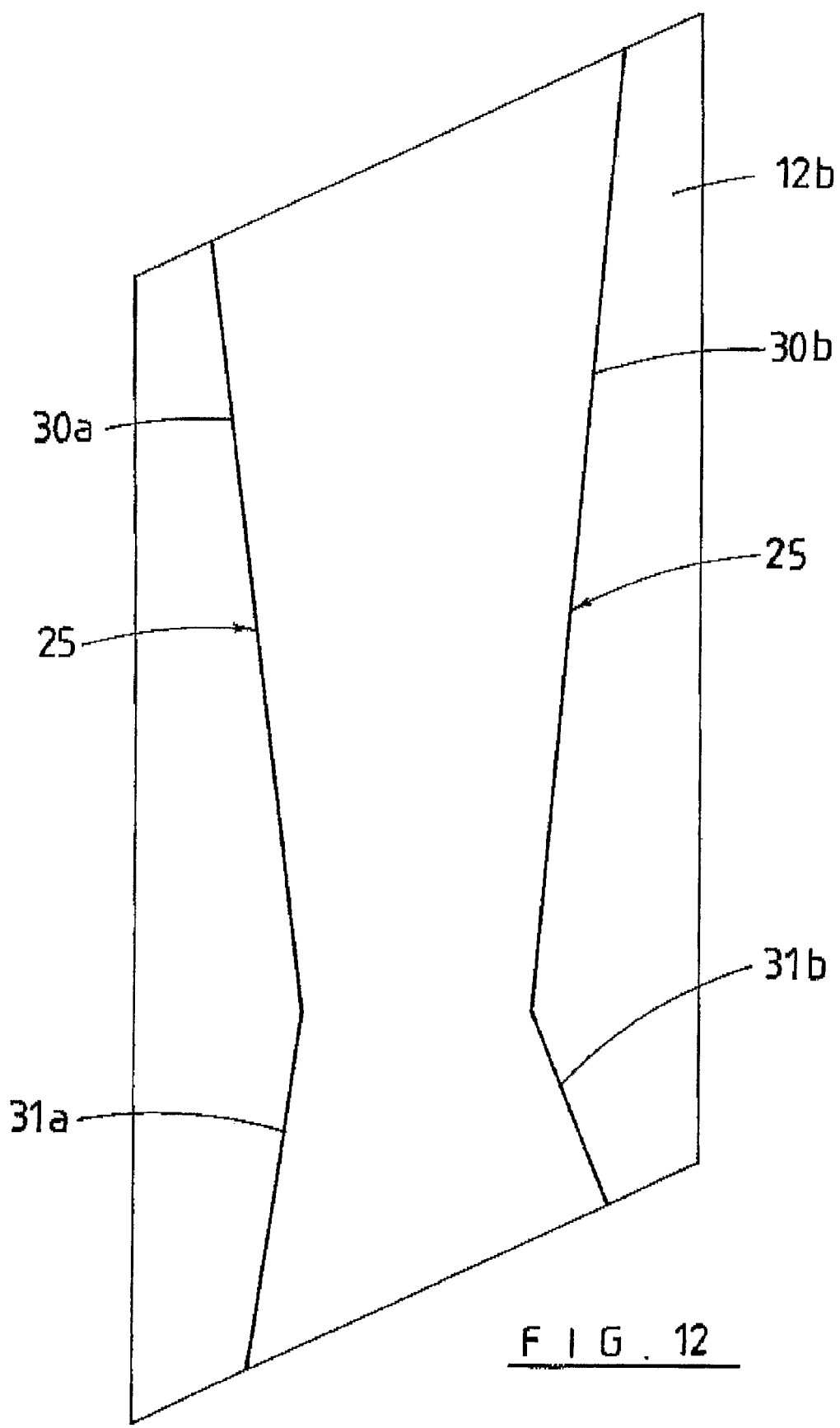
FIG. 12 is a face view of the other and opposite sidewall of the portal structure of FIG. 10.

Two embodiments of the portal antenna according to the present invention are described herein and shown in FIGS. 1 to 4 and FIGS. 6 to 7 of the drawings. In FIGS. 10 to 12 there is shown a third embodiment in which a different layout of wires/conductors is provided by way of grooves formed in the portal structure.

The first embodiment, with reference to FIGS. 1-5 is what can be described as an inclined portal with horizontal radiators while the second embodiment, as shown more particularly in FIGS. 6 and 7, is a vertically disposed portal with diagonal radiators.

Referring firstly to FIGS. 1-4, the portal antenna 10 is based on a portal structure 11 formed from plastic, timber or any non-metallic material. In the preferred form of the invention the portal structure 11, when looking end on (i.e. FIG. 1), includes a pair of parallel sidewalls 12 each of which merges into inclined wall 13. The inclined walls 13 converge to a cross-wall 14 at the bottom of the portal structure 11. A top wall 15 extends between the upper extremities of the sidewalls 12.

In the first form of the invention, the portal structure 11 extends upwardly away from the bottom wall or floor 14 at an angle of about 60° as can be seen in FIG. 2. In use, the floor or bottom wall 14 will be approximately horizontal or, at least, parallel to the floor of the stock race in which the portal antenna is, in use, located.

Into the portal structure 11 (e.g. by way of grooves formed therein) an antenna wire is wound. As shown in FIG. 3 the antenna wire is wound in multiple turns adjacent one end of the portal structure 11. These multiple turns of the conductor 17 form a loop 18. Loop 18 runs parallel to the edge of the portal structure 11 so that an animal will pass through the loop 18 as it enters the portal structure.

The wire or conductor 17 is then laid over to the other edge of the portal structure 11 where a second loop 19 is wound. This second loop 19 is located adjacent the edge where the animal will exit the structure, assuming that the direction of movement of the animal is as shown in FIGS. 3 and 4. Consequently, an animal passing through the portal antenna 10 will pass through two loops 18 and 19 formed from a single conductor 17.

The start of the conductor 17 and the end of the conductor terminates at an electrical connector 20 (e.g. mounted by top wall 11) to allow circuit connection to the control electronics of the reader for the RFID devices. The control electronics of the reader, as indeed the reader itself, does not form part of the invention and hence is not described herein.

The second coil or loop 19 is wound in an opposite direction to the first coil loop 18. The loops 18 and 19 are, therefore, out of phase.

Once the loops 18 and 19 have been wound onto the portal structure a suitable protective covering 32 (see FIG. 13) can be applied thereover. This covering can be in the form a plastic welded bead, an epoxy mixture, or any other non-conductive, waterproof seal.

In FIG. 3 there is shown, by way of arrows, the direction of travel of an animal though the portal antenna. However, the antenna can be used bi-directionally. Therefore, the animal may travel in the opposite direction if such is the direction of movement of the animals through the race in which the portal antenna is located.

In a preferred embodiment the portal antenna 10 is located between a plurality of elongate radiators in the form of ferrous/magnetically conductive metal pipes 21 of about 1 meter in length. These pipes 21 extend horizontally or in other words substantially parallel to the direction of travel of an animal through the antenna structure. These pipes 21 act as radiators to extend the antenna read field.

Therefore, according to this preferred form of the invention the radiators 21 are nominally horizontal while the portal structure 11 lies at an angle of around 60° to the radiators. More particularly the coils 18 and 19 are at an angle of substantially 60° to the radiators.

The intention with such a design is that if a null zone is formed in the centre zone of the antenna it (the null zone) will be on an opposing angle of substantially 60°. This means that it will be almost impossible for an animal to move through the antenna and follow the null zone.

A further role of the radiators is to distort the electromagnetic field created by the antenna so that the field couples in a more optimal manner with the RFID devices carried by the animals.

Figure 5:
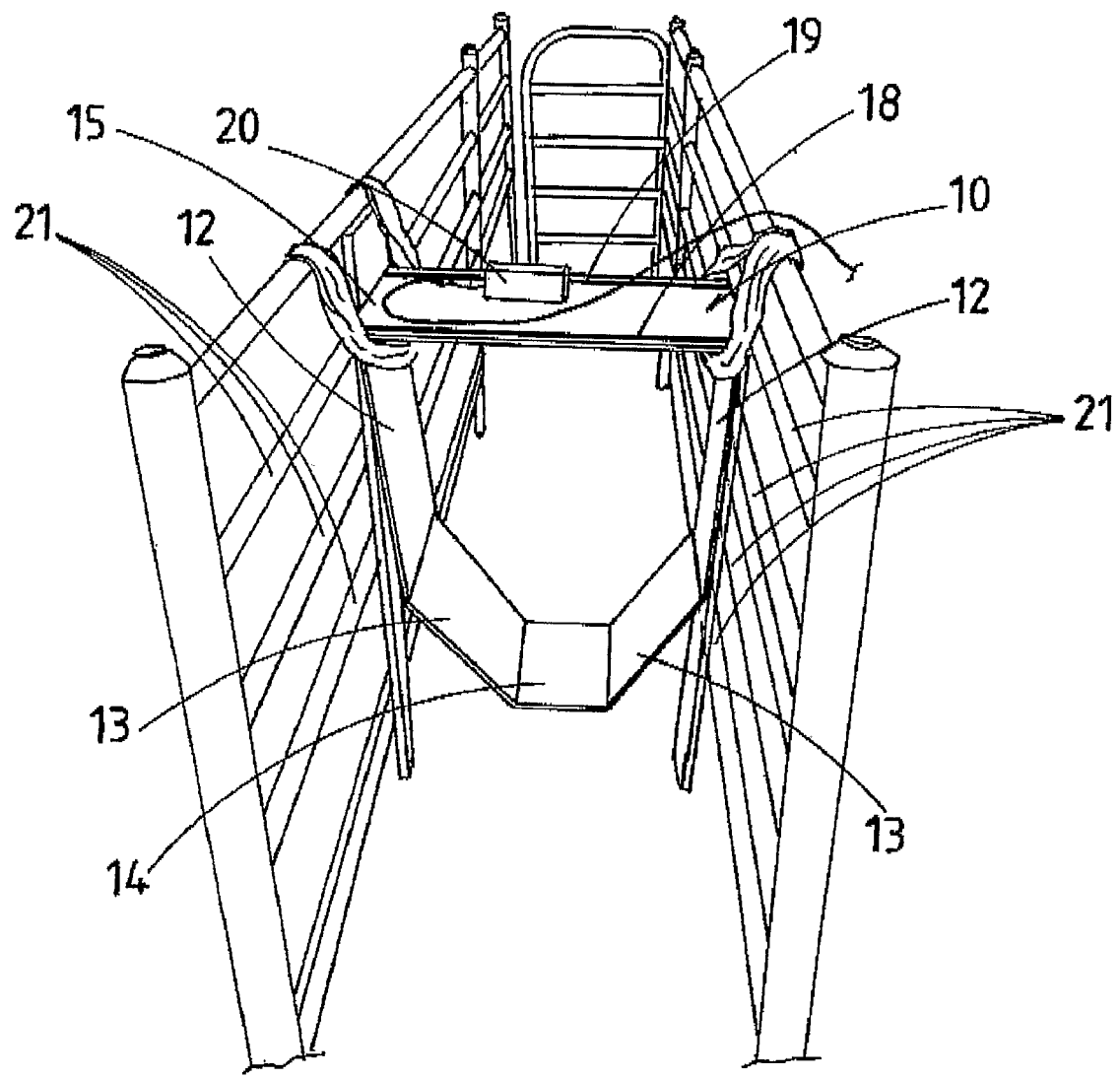
FIG. 5 is a perspective illustration of the antenna in a stock race.

The horizontal pipe sections 21 can be formed by the pipe work of a skeletal frame forming the sides of the race as shown in FIG. 5. The effective length of the radiators will be determined by a vertical pipe or metal strap located either side of the portal antenna so that the effective length of the pipe sections forming the radiators will be approximately 1000 mm as previously described.

It is believed that it is desirable that the length of the radiators be in the order of 1000 mm in length because increasing the dimension of the radiators will diminish the performance by introducing multiple RFID devices into the "read zone" of the portal antenna.

Figure 9:
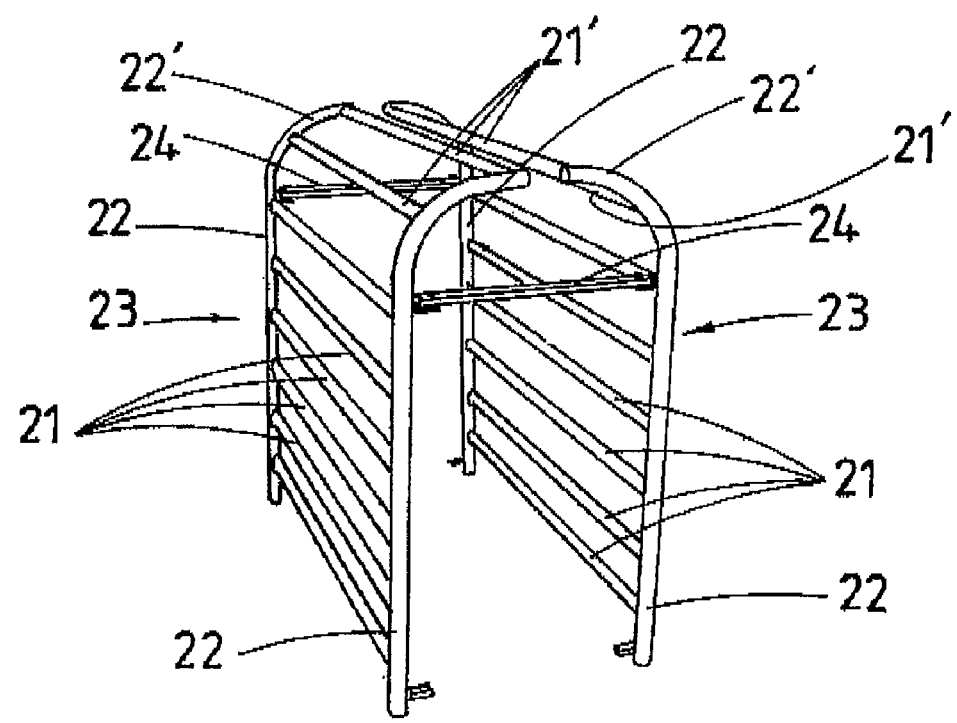
FIG. 9 is a view similar to FIG. 8 but showing a structure intended for use with the antenna as illustrated in FIGS. 1 to 4.

FIG. 9 shows a frame comprising the horizontal pipes or radiators 21 with vertical end pipes 22. The resultant opposing side frames 23 are spaced apart by cross members 24 which as shown can be at the upper end of the sides but equally cross members can also be provided at the lower end of the side frames. It is envisaged that such an arrangement could be incorporated into a stock race by forming parts of the sides of the race or in the event of say, a timber race, the metal frame can be located therewithin.

The arrangement shown in FIG. 9 illustrates a further form of the invention where additional radiator bars or pipes 21' are located over the top of the portal antenna thereby including coverage above the head of the animal. These additional radiators 21' are located between curved upper extensions 22' of the vertical pipes 22.

Turning now to FIGS. 6 and 7 there is shown an alternative embodiment of the portal antenna. According to this arrangement the portal structure 11' is of a largely vertical orientation and is intended for use with radiator bars that are diagonal to the vertical orientation of the portal structure 11'.

As with the first described embodiment the antenna conductor is wound onto the portal structure with multi turns of the conductor to form loops adjacent each edge of the structure. Thus, as with the first described embodiment, an animal passing through the structure will pass through a loop upon entry and a second loop upon exit.

In the preferred form of the invention, according to this embodiment, the radiators are once again metal pipe sections of about 1000 mm in length but unlike the first embodiment these pipe sections extend in a direction about 60° to the horizontal. Once again, these angled radiator bars in conjunction with the largely vertical portal structure, will ensure that if a null zone is formed in the centre zone of the antenna, the null zone will be distorted at an angle close to 60°. Consequently, it will be almost impossible for an animal to move through the antenna and follow the null zone.

Figure 8:
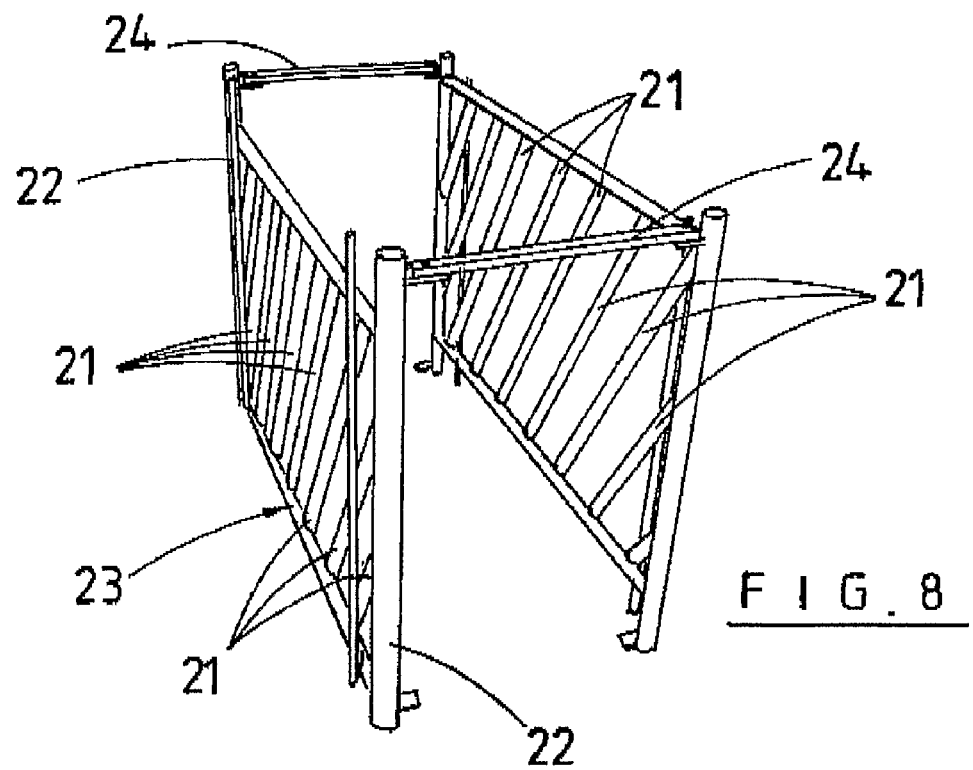
FIG. 8 is an illustration of a framework with diagonal pipe sections into which the portal antenna structure as shown in FIGS. 6 and 7 can be mounted.

Referring to FIG. 8 there is shown an arrangement similar to FIG. 9 but with the radiators located at the aforementioned 60° angle.

The invention is open to modification as will be apparent to those skilled in the art. Variations to the embodiments disclosed herein can include the use of a single portal coil or more than two coils. A further possible modification is changing the shape of the portal structure 11 so that it forms a dome or a substantially "A" section at the top. In a further variation the relative angle between the portal structure and the radiators can differ from that described herein.

As disclosed above the conductor 17 is preferably wound into the portal structure 11 this being achieved by way of, for example, grooves formed in the walls and top and bottom of the portal structure. The groove can be of any suitable cross-section shape such as u-shape, which is preferred, but can be a shallow V-shape, curved shape or some other form of angular cross-section.

In the first and second embodiments described herein, the coils 18 and 19 are wound so as to be substantially parallel to the edges of the portal structure. This is shown, for example, in FIGS. 4 and 6. However, in FIGS. 10-12 a different layout of grooves is formed for the purpose of distorting the shape of the generated electromagnetic field to gain better coupling to the device on the animal.

As is illustrated in FIG. 10 the top wall 15 and bottom wall 14, as well as one of the inclined walls 13, are provided with grooves 25 whereby the conductor will extend parallel to the edge of the walls. The other of the inclined walls 13 has the grooves diverging from an upper end down to the bottom wall 14. As shown in FIG. 10 a more complex shaping of the grooves 25 are formed with FIGS. 11 and 12 showing face views of the sidewalls 12 to more fully define the shape of the grooves 25.

The side wall 12a of FIG. 10 has grooves 25 that have lengths 26a and 26b that converge downwardly from the top edge of the sidewall 12a. One groove 25 then inclines along length 27 away from the other groove 25 to form a continuous straight line to the bottom edge of the sidewall 12a. The other groove 25 similarly inclines away along length 28 downwardly but at its lower end is formed so as to extend along length 29 which is substantially parallel to the side edge of the sidewall 12a.

With the sidewall 12b the grooves 25, once again, converge along lengths 30a and 30b inwardly from the top edge and then diverge downwardly via lengths 31a and 31b toward the lower end of the sidewall 12b. The points at which each of the grooves 25 changes from being convergent to divergent are at different distances from the top edge as is shown in FIG. 12. This is similar to the arrangement in FIG. 11 where the point at which the convergent grooves 25 change to divergent is at a different point from the top of the side wall 12a.

The purpose of this complex layout of the grooves 25 in sidewalls 12a and 12b is to distort the generated electromagnetic field to achieve a complex field pattern that allows better electrical coupling between the field and the conductors in the radio frequency device carried by the animal. Additionally, this field distortion causes the null zone to be minimised greatly. This embodiment is highly effective for race reading particularly when radiator bars described in the earlier embodiments are not present.

A further difference between the portal antenna using the structure in FIGS. 10-12 is that the coils 18 and 19 are wound "in phase". This means that the coil 18 is wound in the same direction as the coil 19.

The present invention, therefore, provides a portal antenna that forms a tunnel which can be placed in a stock race. The tunnel can be used bi-directionally. Animals tagged with low frequency RFID devices can be moved through the antenna in order to read the RFID devices.

The invention claimed is:

1. A portal antenna comprising:
   a portal structure defining an area through which an animal can pass;
   at least one coil of antenna conductor wound around the portal structure to extend around the area through which an animal can pass, where the antenna coil has a read field including a null zone; and
   a plurality of elongate radiator elements of magnetically conductive material, where the radiator elements are configured to extend the read field of the antenna coil;
   wherein the antenna coil and at least one of the elongate radiator elements are aligned at an angle so that an animal moving through the portal structure does not follow the null zone;
   wherein the elongate radiator elements include a plurality of pipes which are spaced apart and parallel and extend between vertical end pipes to form a side frame, the side frame forming a separate structure or part of a wall structure of a stock race, a pair of side frames being coupled together by cross members.

2. The portal antenna of claim 1, wherein at least one elongate radiator element has a longitudinal axis that is at an angle of less than 90° to a plane transverse to the direction in which an animal will pass through the portal structure.

3. The portal antenna of claim 1 wherein at least one elongate radiator element is of magnetically conductive metal.

4. The portal antenna of claim 3 wherein at least one elongate radiator element is of up to substantially 1000 mm in length.

5. The portal antenna of claim 1 wherein the plurality of pipes in the side frame extend normal to the end pipes.

6. The portal antenna of claim 1 wherein the plurality of pipes in the side frame extend at substantially 30° to the end pipes.

7. The portal antenna of claim 1 wherein at least one elongate radiator element is at substantially 30° to a plane in which the at least one coil resides.

8. The portal antenna of claim 1 wherein the antenna conductor forms a multiple turn coil, located adjacent an entrance of the portal structure and the portal antenna further comprises a second multiple turn coil located adjacent an exit of the portal structure; said coils being coupled together.

9. The portal antenna of claim 8 wherein the two multiple turn coils are wound in opposite directions.

10. The portal antenna of claim 8 wherein the two multiple turn coils are wound in the same direction.

11. The portal antenna of claim 1 further comprising a connector unit, carried by the portal structure, connected to the at least one coil.

12. The portal antenna of claim 1 wherein a lower end of the portal structure has a floor from which projects at an incline, a pair of opposed walls which connect to substantially vertically disposed walls of the portal structure.

13. The portal antenna of claim 12 wherein the portal structure extends on an incline away from the floor.

14. The portal antenna of claim 13 wherein the portal structure inclines away from the floor at an angle of substantially 60°.

15. The portal antenna of claim 1 wherein grooves are formed in the portal antenna and the antenna conductor is wound into the grooves.

16. The portal antenna of claim 15 wherein a protective cover is applied over the grooves and the antenna conductor located therein.

17. The portal antenna of claim 1, wherein the portal structure is inclined.

* * * * *